(12) United States Patent
Brinkman et al.

(10) Patent No.: US 8,680,205 B2
(45) Date of Patent: Mar. 25, 2014

(54) FLOW ADDITIVE FOR URETHANE SYSTEM

(75) Inventors: Larry F. Brinkman, Woodstock, IL (US); Mai Chen, Hoffman Estates, IL (US); David E. Vietti, Cary, IL (US); Melinda L. Einsla, Chalfont, PA (US); Joseph James Zupancic, Glen Ellyn, IL (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 13/547,173

(22) Filed: Jul. 12, 2012

(65) Prior Publication Data

US 2013/0018152 A1    Jan. 17, 2013

Related U.S. Application Data

(60) Provisional application No. 61/508,093, filed on Jul. 15, 2011.

(51) Int. Cl.
*C08L 75/06*  (2006.01)

(52) U.S. Cl.
USPC ............ 525/127; 525/131; 525/123; 525/455

(58) Field of Classification Search
USPC ................................. 525/127, 131, 123, 455
See application file for complete search history.

(56) References Cited

U.S. PATENT DOCUMENTS

| | | | |
|---|---|---|---|
| 3,028,367 A | | 4/1962 | O'Brien |
| 3,644,457 A | * | 2/1972 | König et al. .................... 60/351 |
| 3,763,079 A | | 10/1973 | Fryd |
| 4,206,299 A | | 6/1980 | Yamazaki et al. |
| 4,419,476 A | | 12/1983 | Coughlin et al. |
| 5,096,980 A | | 3/1992 | Yamazaki et al. |
| 5,527,616 A | | 6/1996 | Hatano et al. |
| 5,763,527 A | * | 6/1998 | Chen et al. ..................... 524/590 |
| 6,515,068 B1 | | 2/2003 | Swora et al. |
| 6,579,406 B2 | * | 6/2003 | Brinkman .................. 156/331.4 |
| 6,730,738 B2 | * | 5/2004 | Brinkman ..................... 525/131 |
| 7,220,338 B2 | * | 5/2007 | Chen et al. ................. 156/331.4 |
| 2003/0232956 A1 | * | 12/2003 | Brinkman ....................... 528/59 |
| 2005/0143552 A1 | | 6/2005 | Ikeda et al. |
| 2006/0205909 A1 | * | 9/2006 | O'Brien .......................... 528/44 |
| 2007/0072992 A1 | | 3/2007 | Chen et al. |
| 2008/0132714 A1 | | 6/2008 | Hillshafer |
| 2013/0018146 A1 | * | 1/2013 | Brinkman et al. ............. 524/590 |

FOREIGN PATENT DOCUMENTS

| | | | |
|---|---|---|---|
| CA | 2048444 A | * | 2/1992 |
| CN | 101704936 A | | 5/2010 |
| EP | 0470461 A2 | | 2/1992 |
| WO | 9730100 | | 8/1997 |

\* cited by examiner

*Primary Examiner* — Mike M Dollinger
(74) *Attorney, Agent, or Firm* — Kenneth Crimaldi

(57) ABSTRACT

A method for improving flow of a two-component urethane system by adding a hydroxy-functional acrylic polymer.

11 Claims, No Drawings

FLOW ADDITIVE FOR URETHANE SYSTEM

BACKGROUND

This invention relates generally to a flow additive for a urethane system which can be coated onto a substrate to produce a substantially uniform coating of adhesive.

Flow additives for two-component urethane systems are well known. For example, MODAFLOW flow additives are used for this purpose and are known to contain polymerized residues only of (meth)acrylic acids and alkyl esters. However, there is a need for alternative flow additives which have improved properties.

STATEMENT OF INVENTION

The present invention is directed to a method for improving flow of a two-component urethane system by adding a hydroxy-functional acrylic polymer.

DETAILED DESCRIPTION

All percentages are weight percentages, and all temperatures are in °C., unless otherwise indicated. Percentages of monomer residues are on a solids basis, i.e., excluding solvents. A "hydroxy-functional acrylic polymer" is a polymer having at least one hydroxyl group per polymer chain, wherein the hydroxyl group is attached to an aliphatic carbon atom, and wherein the polymer comprises at least 60 wt % polymerized monomer residues of acrylic monomers, e.g., (meth)acrylic acid, alkyl and/or hydroxyalkyl(meth)acrylates, preferably at least 70 wt %, preferably at least 80 wt %, preferably at least 90 wt %, preferably at least 95 wt %. "(Meth)acrylic" refers to either acrylic or methacrylic. Hydroxy-functional acrylic polymers may also contain polymerized residues of monomers other than those listed above, e.g., styrene, vinyl esters, (meth)acrylamides, etc. "Phthalic acid" refers to benzene-1,2-dicarboxylic acid. Polymerized residues of phthalic acid may be the result of using either phthalic acid or phthalic anhydride as a starting material in preparation of the hydroxy-terminated polyester polyol. "Aliphatic acids" are dicarboxylic acids having no aromatic rings, e.g., adipic acid, azelaic acid, glutaric acid and succinic acid. "Toluene diisocyanate" refers to the commercial product sold under this name, which is predominantly the 2,4-isomer, with small amounts of the 2,6-isomer, and possibly other isomers.

Preferably, the hydroxy-functional acrylic polymer has $M_n$ from 5,000 to 70,000; preferably $M_n$ is at least 6,000, preferably at least 7,000, preferably at least 8,000; preferably $M_n$ is no greater than 60,000, preferably no greater than 50,000, preferably no greater than 40,000, preferably no greater than 30,000, preferably no greater than 20,000, preferably no greater than 15,000. Preferably, the hydroxyl-containing monomer is from 10 to 50 mole % of the acrylic polymer; preferably at least 12 mole %, preferably at least 15 mole %; preferably no greater than 30 mole %, preferably no greater than 25 mole %. Preferably, the hydroxyl-containing monomer is a hydroxyalkyl(meth)acrylate, preferably a $C_2$-$C_8$ hydroxyalkyl(meth)acrylate, preferably a $C_2$-$C_4$ hydroxyalkyl(meth)acrylate, preferably a $C_2$-$C_3$ hydroxyalkyl(meth)acrylate. Preferably, the amount of the hydroxy-functional acrylic polymer in the combined components of the urethane system is from 0.01 to 5 wt %; preferably at least 0.1 wt %, preferably at least 0.3 wt %, preferably at least 0.5 wt %; preferably no more than 3 wt %, preferably no more than 2 wt %, preferably no more than 1.5 wt %, preferably no more than 1 wt %.

Preferably, the two-component urethane system comprises: (a) a hydroxy-terminated polyester polyol; and (b) an isocyanate-terminated prepolymer comprising polymerized residues of at least one of diphenyl methane diisocyanate and toluene diisocyanate, and a glycol or polyol. Preferably, the glycol or polyol has $M_n$ from 90 to 1000. Preferably, the hydroxy-terminated polyester polyol comprises polymerized residues of: (i) phthalic acid and (ii) an aliphatic diol having $M_n$ from 60 to 150; wherein the hydroxy-terminated polyester polyol has a hydroxyl number from 15 to 60 mg KOH/g. Preferably, the hydroxy-terminated polyester polyol has no more than 15 wt % polymerized residues of aliphatic acids.

Preferably, the hydroxy-terminated polyester polyol contains polymerized and esterified residues of phthalic acid and an aliphatic diol; it may also contain other di-acids and diols. Preferably, a hydroxy-terminated polyester polyol has no more than 10 wt % polymerized residues of aliphatic acids, preferably no more than 5 wt %, preferably no more than 3 wt %. The aliphatic diol may be an α,ω-dihydroxy alkane or an ethylene or propylene glycol oligomer. Preferred aliphatic diols include ethylene glycol, propylene glycol, 1,4-butanediol, 1,6-hexanediol, diethylene glycol, dipropylene glycol and triethylene glycol. Especially preferred aliphatic diols include diethylene glycol and 1,6-hexanediol. Preferably, the aliphatic diol has $M_n$ from 90 to 150, preferably from 90 to 130, preferably from 100 to 125. The hydroxy-terminated polyester polyol is a hydroxy-terminated polyester, preferably with a hydroxyl number from 15 to 55 mg KOH/g, preferably from 20 to 50, preferably from 22 to 35. Preferably, the hydroxy-terminated polyester polyol contains from 40% to 75% polymerized residues of phthalic acid; preferably at least 45%, preferably at least 48%, preferably at least 50%, preferably at least 52%; preferably no more than 70%, preferably no more than 65%, preferably no more than 63%, preferably no more than 61%, preferably no more than 59%. Other isomers of phthalic acid (e.g., isophthalic acid or terephtahalic acid) may also be used to make the hydroxy-terminated polyester polyol, but preferably these other isomers are no more than 20 wt % of the total weight of di-acids, preferably no more than 15 wt %, preferably no more than 10 wt %, preferably no more than 7 wt %, preferably no more than 5 wt %. Preferably, the hydroxy-terminated polyester polyol contains from 25% to 60% polymerized residues of an aliphatic diol having $M_n$ from 60 to 150; preferably at least 30%, preferably at least 35%, preferably at least 37%, preferably at least 39%; preferably no more than 55%, preferably no more than 52%, preferably no more than 50%, preferably no more than 48%. Small amounts of residues of compounds with more than three hydroxy groups may be present to increase branching, e.g., pentaerythritol. Preferably, the amount of residues of compounds with more than three hydroxy groups is no more than 5% of the total amount of diol(s), preferably no more than 2%, preferably no more than 1%, preferably no more than 0.5%, preferably no more than 0.2%, preferably no more than 0.1%. Suitable triols include, e.g., glycerol, trimethylol ethane, trimethylol propane and castor oil. The amount of diols, triols, and tetra-ols added is sufficient to react with all of the carboxyl functionalities and to result in a polyol with a hydroxyl number from 15 to 60 mg KOH/g. This amount can be calculated easily from the amounts of other ingredients.

Preferably, the hydroxy-terminated polyester polyol is produced by the steps allowing phthalic anhydride (or phthalic acid) to react with the aliphatic diol at a temperature from 150° C. to 260° C. Preferably, the reaction temperature is from 150° C. to 240° C., preferably from 170° C. to 235° C., preferably from 180° C. to 230° C. Preferably, the reaction pressure is about atmospheric pressure (about 100 kPa), although reduced pressure may be used to assist in removing water formed in the esterification reaction. Preferably, the reaction mixture is heated first to about 100-130° C., followed by heating to the indicated reaction temperature to remove water. Reaction times of course will vary with the other conditions, and can be determined easily by one skilled in the art, but typically are in the range from 5 hours to 30 hours, preferably from 12 to 25 hours. Preferably, an esterification/transesterification catalyst is present in an amount no more than 0.2 wt %, preferably no more than 0.05 wt %. These catalysts are well known in the art and include tin, titanium, bismuth and zirconium catalysts. Tin catalysts are preferred, especially alkyltin tris-alkanoates and hydroxybutyl tin oxide, but titanates, e.g., tetra-alkoxy titanates or bismuth alkanoates or mixtures thereof may also be used.

Preferably, the glycol or polyol having $M_n$, from 90 to 1000 which is incorporated into the isocyanate terminated prepolymer has two to three hydroxyl groups per molecule. Preferably, the glycol or polyol has $M_n$, from 150 to 800, preferably at least 250, preferably at least 300; preferably no more than 700, preferably no more than 600. Preferably, the polyol is a polyether or polyester polyol, preferably a polyether polyol. Preferably, the isocyanate-terminated prepolymer comprises polymerized residues of: (i) 50 to 85 wt % of at least one of MDI and TDI; and (ii) 15 to 50 wt % of a glycol or polyol having $M_n$, from 90 to 1000; preferably at least 55 wt % MDI/TDI and no more than 45 wt % glycol or polyol, preferably at least 60 wt % MDI/TDI and no more than 40 wt % glycol or polyol, preferably at least 65 wt % MDI/TDI and no more than 35 wt % glycol or polyol, preferably no more than 80 wt % MDI/TDI and at least 20 wt % glycol or polyol.

The isocyanate-terminated prepolymer has polymerized residues of MDI and/or TDI. Other difunctional isocyanates may be present, e.g., an aliphatic diisocyanate, e.g., hexamethylene diisocyanate. MDI may be a mixture of 4,4' and 2,4' isomers. Preferably, at least 80 wt % of the polymerized residues of isocyanates in the isocyanate-terminated prepolymer are from MDI and TDI, preferably at least 85 wt %, preferably at least 90 wt %, preferably at least 95 wt %. Preferably, at least 50 wt % of the MDI residues are from the 4,4' isomer, preferably at least 70 wt %, preferably at least 80 wt %, preferably at least 90 wt %, preferably at least 95 wt %. The difunctional aromatic isocyanate is mixed with a polyol to form the isocyanate-terminated prepolymer. In some embodiments of the invention, the polyol mixed into the isocyanate component is at least one difunctional or trifunctional polymer of ethylene oxide, propylene oxide or a combination thereof. Preferably, the isocyanate-terminated prepolymer has an isocyanate content from 7% to 21%, more preferably from 11% to 15%.

In the two-component urethane system, the relative proportions of isocyanate groups to isocyanate-reactive groups may vary as desired, preferably within a molar ratio of NCO/OH groups of 0.9:1 to 2:1. Preferably, the NCO/OH group molar ratio is from 1:1 to 1.8:1, alternatively from 1.1:1 to 1.6:1, alternatively from 1.2:1 to 1.4:1.

Preferably, the components of the two-component urethane system are diluted with solvent prior to coating onto a substrate. As the term is used herein, a solvent is a substance which is liquid at 25° C. and has a boiling point at atmospheric pressure of no more than 100° C. Preferably, the combined components of the system as applied to the substrate contain from 45-60 wt % solids, preferably from 46-57 wt %, preferably from 47-55 wt %, preferably from 48-53 wt %. Suitable solvents include ethyl acetate, methyl acetate and methyl ethyl ketone. Ethyl acetate is especially preferred.

The two components of the urethane system preferably are mixed using a suitable mixer (e.g., an electrically, pneumatically, or an otherwise powered mechanical mixer, or a static mixer) prior to or during application to a substrate to form the bonding agent. Thus, the isocyanate component typically will be packaged separately from the polyol component. Mixing may take place at any suitable time prior to the laminating process. All of the present steps may be carried out under ambient room temperature or supra-ambient conditions. For example, the two components may be heated just prior to mixing and applied at elevated temperature during the coating and lamination process. Preferably, the temperature does not exceed 65° C. As desired, heating or cooling may be applied to the resulting laminate. Preferably, a gravure cylinder is used to transfer the mixed adhesive composition to a film, which is then laminated to a second film.

Preferably, phosphoric acid or a mixture of phosphoric acid and an epoxy resin is added to the composition to promote stability, improve adhesion and minimize viscosity build. Preferably the epoxy resin is a solid epoxy resin. Preferably, the phosphoric acid/epoxy resin mixture is added in an amount from 0.1 to 2 wt % of the combined components, preferably from 0.2 to 1.5 wt %, preferably from 0.3 to 1 wt %. Preferably, the phosphoric acid/epoxy mixture contains 5 to 40 wt % phosphoric acid, preferably 7 to 30 wt %, preferably 8 to 18 wt %. Preferably when phosphoric acid alone is added to promote stability, it is added in an amount from 0.01 to 2 wt % of the combined components, preferably from 0.03 to 1 wt %, preferably from 0.04 to 0.1 wt %. Preferably a solvent, e.g., ethyl acetate, is added to the mixture in an amount from 30-70 wt % of the total mixture including solvent.

The two-component urethane system is useful for bonding two to five substrates together. The substrates may be similar material or dissimilar material. Preferably, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. Preferably, the substrate layers are provided in the form of rolls of substrate material. The sheets may be on the order of 0.5 to 10 mil in thickness. Larger thicknesses are also possible, as are smaller thicknesses (e.g., on the order of 5 or more microns).

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. The bonding agent is particularly attractive for packaging and sealing applications for laminating plastic films, metal films or metallized plastic films. Especially preferred films include low density polyethylene, high density polyethylene, polypropylene (cast, blown oriented, biaxially drawn), nylon, polystyrene, co-extruded films, polyester film, ceramic (SiOx, AlOx) coated film (polyester, nylon, etc.), polyacrylic acid-coated film (polyester, nylon, etc.), polyvinylidene chloride coated film, metallized film (polyester, polypropylene, etc.).

EXAMPLES

Solution viscosities were measured using a Brookfield viscometer operating at a temperature of approximately 25° C.

and with fittings appropriate for the viscosity ranges measured. Resin viscosities were measured on an ICI cone and plate viscometer at the plate temperatures indicated. Resins were prepared as described in the following procedures.

Example 1

Preparation of Polyester for Use as One Part of a Solvent Based Polyurethane Adhesive that may be Applied at High Solids Concentration 1. Diethylene glycol (343 lbs, 156 kg), phthalic anhydride (440 lbs, 200 kg) and 1 lb (454 g) of Fascat 9100 (C4H9 SnO(OH) catalyst from Arkema) were charged to a 100 gallon (379 L) stainless steel reactor equipped with a jacketed fractionating column and a condenser.
2. The heterogeneous mixture was heated to 100-130° C. and held at 120-130° C. for 0.25-0.50 hrs.
3. The resin mixture was heated gradually to 225° C. At about 190° C., water began to distill. After 90-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450-500 torr The vacuum was gradually decreased to about 25-50 torr.
4. The reaction was held at 225° C. and 25-50 torr until the acid number of the polyester was <2.0 mg KOH/g sample. When the polyester resin viscosity was 2080 mPas at 100° C. and the acid number 1.7, the reactor was cooled and ethyl acetate added to obtain 74-76% solids. The final product test results showed: 75.5% solids, acid number 1.2 and OH number 27.2 mg KOH/g sample and viscosity was 750 mPas. Other batches prepared by this process gave acid numbers ranging from 1.2-1.6 and hydroxyl numbers 24-28 mg KOH/gram at 74-76% solids.

Example 2

Preparation of Isocyanate Terminated Prepolymer

The jacket on a five gallon glass lined reactor was heated to 50° C. Molten ISONATE 125M (33.5 lbs, 15.2 kg) was charged to the reactor and the temperature kept above 50° C. to prevent it from freezing. The reaction mixture was continuously stirred and kept under an atmosphere of dry nitrogen. VORANOL CP 450 (1.25 lbs, 0.57 kg) was charged followed by 425 mole weight polypropylene glycol. The polyols were added at a rate to keep the temperature in the reactor above 50° C. The reactor was heated and held at 60-65° C. for 30 minutes. The temperature was increased to 80° C. and held at 80-90° C. for one hour. The reactor was cooled to 60 C then 9 lbs (4.1 kg) of ethyl acetate and 8.2 grams of benzoyl chloride added. The product analysis showed: 85.7% solids, 12.8% NCO and viscosity was 394 mPas.

Example 3

High Speed Lamination with No Additives

Laminations were run on an Egan laminator. Drier oven zones 1-3 were set at 180 (82), 170 (77) and 180 (82) ° F. (° C.). Nip roll temperature was 180° F. (82° C.). Gravure cylinders with quadrangular shaped cells engraved at 130-180 lines/inch (51-71 lines/cm) were used. The adhesives tested were made from the polyester (Example 1) combined with DESMODUR L-75 (Bayer Corporation) or the isocyanate terminated prepolymer described in Example 2 (100/18 parts by weight). The solution was diluted to target % solids with dry ethyl acetate. Table 1 shows the adhesives, adhesive viscosity at running solids, additives, films, gravure cylinder used and applied coat weight. In general, the adhesives had a hazy appearance when they were first coated due to the transfer of the cell pattern and variation in adhesive thickness. While the adhesive cures, the pressure from the wrap of the film on the roll helps smooth out the adhesive and some of the cured films were clearer and acceptable. However, the initial hazy appearance is undesirable, because one cannot always rely on the appearance to improve during curing. The cylinders with higher lines/inch (finer pattern) gave better appearance, but the smaller cylinder volume gave low coating weights In some samples, DOWANOL PMA (Propylene glycol methyl ether acetate, Dow Chemical Company) was added to see if the slower evaporating solvent would aid the flow adhesive as it dried. The PMA was not effective in improving appearance and it lead to some reduction of green bonds.

Example 4

Lab Screening Study of Surfactants or Flow and Wetting Additives

Samples of the films were cut into 9"×12" (22.9×30.5 cm) sections. Films requiring corona treatment were treated to obtain a surface energy of 36 dynes or higher. The secondary film was placed on the rubber pad of the laminator (treated side up). The primary film was attached to a hard flat surface (treated side up). A sample of the mixed adhesive diluted to 50% solids was applied to the primary film with a Meyer #6 wire wound rod. The coat weight was approximately (2.75-3.0 g/m$^2$). If necessary, the adhesive concentration was adjusted to obtain the target coat weight. The solvent was evaporated from the adhesive by placing the coated film in an 80° C. forced air oven for 30 seconds. The primary film was removed from the plate and the top edge of the film (adhesive side down) mated to the top of the secondary film on the laminator pad. The oil heated roller of the laminator was passed over the films pulling the primary film in contact with the secondary film and laminating the two films together. The initial or "green" bonds were tested as soon as possible after the laminate was made. The T-peel test was done on laminate samples cut to 15 mm or 25 mm (1 inch) wide strips and pulled at a rate of 10 in/min (25.4 cm/min) Conversion factors were used as necessary to report bond values as N/15 mm.

All laminates made in this manner gave smooth coatings of adhesive with no evidence of haziness or uneven application. So, it was not possible to detect the problems seen with the gravure cylinder pattern that was apparent in the high speed coating process. A screening study was done to look for additives that might improve flow of the adhesive after application in the high speed process. Several surfactants were tested. Table 2 shows that when these were used, there was a significant drop in green bond strength. MODAFLOW 2100 is an commercial product marketed to improve flow and wetting of paint and coatings. When this was tested, it did not reduce the green strength as much as other additives. Although the MODAFLOW is soluble in ethyl acetate, it was not miscible with the adhesive solution. It gave a hazy mixture. Phase separation was slow, but was complete in a few days.

Example 5

Egan Laminator Study of Flow and Wetting Additives

Based on the results of the lab studies, MODAFLOW and other related additives were tested on the high speed laminator with the application conditions described in Example 3. A cylinder with quadrangular cells connected by channels was used and this cylinder gave some improvement in adhesive flow and smoothing over that observed with simple quad cylinders. Tables 3 & 4 show that the acrylic additives MODAFLOW and BYK 392 (non-hydroxy-functional acrylics) were somewhat effective at improving the flow the adhesive after it was transferred from the cylinder to the film. The coating was smoother and clearer. With the additives, acceptable appearance could be obtained even with the adhesive applied at 55% solids. Also, the green strength was maintained. The problem with these additives was that they were not miscible with the adhesive solution. If they were added to part A or B, phase separation was observed after a period of hours or days. In order to use these, small amounts would have to be added as a third component at the time the adhesive is mixed. Multi-component mixes like this are undesirable because of the potential for errors. Also, these acrylics have no groups that will react with the isocyanate coreactant. Since they will not be bound to the cured adhesive, there is the potential for them to interfere with adhesion over time. The silicone additive BYK 233 was not effective and it reduced green bonds.

Example 6

Preparation of Hydroxyfunctional (Hydroxyethyl) Acrylic in Polyol

Prepared Mix A and Mix B in stirred tanks. Stirred each mix for at least 30 minutes. Mix B may be stirred longer if necessary to completely dissolve the VAZO 64. Charged 896.8 lbs of polyol VORANOL 230-238 (Dow Chemical Co.) to reactor equipped with jacket for heating/cooling and reflux condenser. Purged the reactor with a slow stream of nitrogen throughout the process. Heated the reactor to 80° C. with agitation. Held the batch at 80° C. for 30 min Started feeding Mix B at 0.25 lb/min (0.11 kg/min) and continued feeding for 30 minutes. While continuing to feed Mix B, started feeding Mix A at 0.75 lbs/minute (0.34 kg/min) and continued feeding for one hour. While still feeding Mix B, increased the feed rate of Mix A to 1.5 lbs/min (0.68 kg/min) and continued feeding for 8 hours. The feed of Mix A and B were completed at about the same time. Charged 224.2 lb (102 kg) of VORANOL 230-238 to the reactor and rinsed the Mix B feed line with 10 lb (4.5 kg) of acetone. Set the reactor for distillation rather than reflux, pulled vacuum on the reactor and heated to 135° C. Continued vacuum distillation for 1 hour. Started a flow of nitrogen through the bottom of the reactor. Continued to sparge the reactor with nitrogen while distilling under vacuum for 10 hours. Cooled to 50° C. or less then packaged. Product viscosity was 2000-3000 mPas; OH number 170-190 mg KOH/gram sample; Mn 14,200, Mw 27,000.

|  | Mix A | Mix B |
|---|---|---|
| Butyl Methacrylate |  | 1.6 lb (0.73 kg) |
| Hydroxyethyl Acrylate |  | 122.1 lb (55.5 kg) |
| Butyl Acrylate |  | 624.9 lb (284.1 kg) |
| VAZO 64 |  | 9.5 lb (4.3 kg) |
| Acetone |  | 111 lb (50.5 kg) |

Example 7

Preparation of Hydroxyfunctional (Hydroxypropyl) Acrylic Additive in Solvent Five mixtures were prepared containing grams of the materials shown in the table below. Mix A was added to a one liter reactor and heated to 82° C. while sparging the reactor with nitrogen. The temperature was gradually increased until the isopropanol just began to reflux. Fifty percent of Mix B was added to the reactor followed by 10% of Mix C. There was a 2-5° C. rise in temperature from the heat of reaction. The remainder of Mix B and Mix C were gradually added over 120 min. The rates of addition were adjusted so that Mix A addition was complete in 120 min and Mix C in 105 min. The reactor was heated to maintain reflux for 60 minutes. Mix D was added and reflux continued for 15 minutes. Mix E was gradually added over 45 minutes then the solution kept at reflux for 60 minutes. The solvent was stripped from the product by vacuum distillation in a 60° water bath. Product properties: Mn 8,300, Mw 17,500

|  | Mix A | Mix B | Mix C | Mix D | Mix E |
|---|---|---|---|---|---|
| Dry Isopropanol | 175.8 | 120.0 |  | 10 | 25.5 |
| TRIGINOX 125-C75 |  | 8 |  | 1.2 | 1.8 |
| Ethylhexyl acrylate |  |  | 320 |  |  |
| Hydroxypropyl methacrylate |  |  | 80 |  |  |

Example 8

Preparation of Hydroxyl Functional (Hydroxyethyl Methacrylate) Acrylic Additive in Solvent Three mixtures were prepared according to the table below. Ethyl acetate (93 g) was charged to a 1 liter reaction flask equipped with stirrer, reflux condenser, nitrogen sparge, thermometer, and two addition ports. The solvent was heated to 75° C. Mix A feed was started at a rate to complete the addition in 246 minutes and Mix B feed was set to complete 240 minutes. Heat was applied to the reactor as necessary to maintain ethyl acetate reflux throughout the addition. After the addition of Mix A and B was complete the reactor was held at reflux for 2 hours. Mix C was added and the reaction kept at reflux for an additional 2 hours. The product was cooled, passed through a 100 mesh filter and packaged. Product properties: Mn 65,300, Mw 177,150.

|  | Mix A | Mix B | Mix C |
|---|---|---|---|
| Butyl Acrylate | 311.4 |  |  |
| Styrene | 0.59 |  |  |
| Hydroxyethyl methacrylate | 68.0 |  |  |
| VAZO 64 |  | 4.7 | .05 |
| Ethyl Acetate |  | 60 | 6 |

Example 9

Hydroxy Functional Acrylate Additives in High Speed Laminations

Table 5 shows that the hydroxy functional acrylics, Examples 6 & 7, effectively improved flow out of the adhesive on the film after deposition from the gravure cells. The initial appearance was good and green strength was maintained. Also, Tables 5-7 show that the hydroxyl functional additives generally gave better cured bonds (film tear rather than cohesive or adhesive failure) than the non-functional additives (Tables 3-4). Like the other acrylics tested these additives were not miscible in the polyester polyol part of the adhesive. Surprisingly, they formed stable emulsions in the solutions of polyester in solvent. The emulsions were stable for weeks or months. Example 6 gave the most stable emulsion which was stable for over 6 months at room temperature. Also, as shown in Tables 5-7, Example 6 additive was more effective than Examples 7 & 8 in giving clear laminates. Table 7 shows that Example 6 acrylic was effective in improving appearance over a range of concentrations. However, it does reduce green bonds when added at higher levels.

TABLE 1

Effect of gravure cylinders on the appearance of laminations.

|   | Polyester polyol | Isocyanate | Dilution Solvent | Visc* (sec) | Solids (%) | Additive | Primary | Secondary |
|---|---|---|---|---|---|---|---|---|
| A | Example 1 | DESMODUR L 75 | EtOAc | 18 | 50 | None | 92LBT | GF19 |
| B | Example 1 | DESMODUR L 75 | EtOAc | 18 | 50 | 2% DOWANOL PMA | PET-Al | GF19 |
| C | Example 1 | DESMODUR L 75 | EtOAc | 18 |  | 2% DOWANOL PMA | 92LBT | GF19 |
| D | Example 1 | DESMODUR L 75 | EtOAc |  | 50 | None | PET-Al | GF19 |
| E | Example 1 | DESMODUR L 75 | EtOAc |  | 50 | None | 92LBT | GF19 |
| F | Example 1 | Example 2 | EtOAc | 17 | 50 | None | 92LBT | GF19 |
| G | Example 1 | Example 2 | EtOAc | 17 | 50 | 5% DOWANOL PMA | 92LBT | GF19 |
| H | Example 1 | Example 2 | MEK | 17 | 50 | None | 92LBT | GF19 |
| I | Example 1 | Example 2 | MEK | 17 | 55 | None | 92LBT | GF19 |
| J | Example 1 | Example 2 | EtOAc | 17 | 55 | None | 92LBT | GF19 |
| K | Example 1 | Example 2 | EtOAc | 22 | 60 | None | 92LBT | GF19 |
| L | Example 1 | Example 2 | EtOAc | 17 | 50 | None | 92LBT | GF19 |

Mix ratio (w/w) of polyester polyol/isocyanate component was 100/18.
*Viscosity was mearured with a # 2 Zahn cup after the adhesive solution had been diluted to the target running solids.
92LBT = 92 guage PET,
GF19 = LDPE,
PET-Al = aluminum foil laminated of PET for reinforcment.
Adhesive applied to aluminum.
DESMODUR L 75 is a TDI based polyisocyanate from Bayer Material Science LLC.
Typical properties: 13.3% NCO, 75% solids, Viscosity 1600 mPas
Films tested:
Polyester (92LBT), Polyethylene (GF19, high slip additive and GF10 low slip additive)
Aluminum foil reinforced by laminating to polyester film (PET-Al) (adhesive applied to Al)

|   | Gravure Cylinder (lines/in) | Coat wt g/sq. m | Appearance Rating* | Green Bond N/15 mm | MOF** | 1 day T Peel N/15 mm | MOF** | 7 d T Peel N/15 mm |   |
|---|---|---|---|---|---|---|---|---|---|
|   | 130 Quad (51.2 lines/cm, 18.2 BCM) | | | | | | | | |
| A | 130 Quad | 4.9 | 2  | 1.82 | AS | 3.09 | AS | 4.93 | AS |
| B | 130 Quad | 4.9 | 2+ | 1.88 | AS | 2.93 | AS | 4.37 | AT |
| C | 130 Quad | 4.9 | 2+ | 1.58 | AS | 3.67 | AS | 6.11 | DES |
|   | 150 Quad, (59.1 lines/cm, 14.8 BCM | | | | | | | | |
| D | 150 Quad | 3.7 | 2 | 1.51 | AS | 2.52 | AS | 4.36 | AT |
| E | 150 Quad | 3.7 | 2 | 1.00 | AS | 2.29 | AS | 3.67 | AS |
| F | 150 Quad | 4.4 | 2 | 1.21 | AS | 3.31 | AS | 5.07 | AT |
| G | 150 Quad | 4.4 | 2 | 0.85 | AS |  |  |  |  |
| H | 150 Quad | 3.6 | 2 | 0.67 | AS | 3.30 | AS | 5.07 | AT |
| I | 150 Quad | 4.1 | 2 | 0.73 | AS | 4.70 | AS | 5.70 | AT |
|   | 180 Quad (71 lines/cm, 11.5 BCM | | | | | | | | |
| J | 180 Quad | 2.0 | 3  | 0.83 | AS | 3.61 | AS | 4.13 | AS |
| K | 180 Quad | 1.8 | 2+ | 0.64 | AS | 3.61 | AS | 3.99 | AS |
| L | 180 Quad | 1.5 | 3  |      | AS | 3.03 | AS | 3.58 | AS |

BCM = Billion cubic microns
Score Initial Appearance
1 distinct cell pattern, hazy, streaks
2 Distinct cell pattern, hazy, not acceptable
3 Distinct cell pattern, hazy, borderline acceptable
4 Some cell pattern, typical commercial adhesive
5 Very little cell pattern

**Mode of Failure:
Appearance after 24 h cure
Hazy, streaks, unnacceptable
some cell pattern, but maybe acceptable
some cell pattern, but acceptable
some cell pattern, but acceptable
very little cell pattern

TABLE 2

Lab screening study for additives

| Polyester (100) | Ex. 1 | Ex. 1 | Ex. 1 | Ex. 1 | Ex. 1 | Ex. 1 |
|---|---|---|---|---|---|---|
| Co-reactant (18) | Ex. 2 | Ex. 2 | Ex. 2 | Ex. 2 | Ex. 2 | Ex. 2 |
| Additive | SURFYNOL 420 | SURFYNOL 440 | TRITON X100 | FLUORAD 4430 | MODAFLOW 2100 | Control (no additive) |
| % Additive | 0.05 | 0.05 | 0.05 | 0.05 | 0.5 | 0 |
| Mixed Viscosity | 22.8 | 25.4 | 26.3 | 24.4 | 33.7 | 25.6 |
|  | N/15 mm | N/15 mm | N/15 mm | N/15 mm | N/15 mm | N/15 mm |
| 92LBT/GF19 |  |  |  |  |  |  |
| Initial | 0.81 | 0.764 | 0.741 | 0.845 | 1.048 | 1.569 |
| 24 hr | 5.12 | 4.759 | 4.904 | 4.979 | 1.048 | 3.619 |
| 7 day | 3.64 | 4.261 | 4.678 | 5.084 | 1.048 | 4.678 |
| PET-Al/GF19 |  |  |  |  |  |  |
| Initial | 0.61 | 0.614 | 0.608 | 0.799 | 1.048 | 1.482 |
| 24 hr | 5.18 | 5.263 | 4.626 | 5.790 | 1.048 | 6.676 |
| 7 day | 5.39 | 5.929 | 5.385 | 5.998 | 1.048 | 7.463 |
| PET-Al/GF19 |  |  |  |  |  |  |
| Initial | 0.34 | 0.347 | 0.295 | 0.388 | 1.048 | 1.158 |
| 24 hr | 3.25 | 3.04* | 3.242 | 3.27* | 1.048 | 2.97** |
| 7 day | 3.24 | 3.00* | 3.069 | 3.07* | 1.05** | 4.55** |

*Mode of Failure = Adhesive transfer from primary (PET or Aluminum) to secondary film
**Mode of Failure = Film break or tear
Mode of failure for all other samples was adhesive split (adhesive on both films)
SURFYNOL 420: Nonionic surfactant from Air Products Company; HLB = 4
SURFYNOL 440: Nonionic surfactant from Air Products Company; HLB = 8
TRITON X100: Octylphenol ethoxylate from Dow Chemical Company; HLB = 13.4
FLUORAD 4430: Fluorosurfactant, 3M Company
MODAFLOW 2100: Cytec Surface Specialties, Inc.: Ethyl acrylate/Ethyl hexyl acrylate copolymer.

TABLE 3

High speed lamination tests with additives to improve appearance

Mix Ratio (Polyester Ex. 1/Coreactant Ex. 2/additive) 100/18/0.5

| Additive (grams/100 g polyester solution) | Structure 1° web | 2° web | Coat wt. g/sq·m | Appearance Rating | Bond Strength (90° T-Peel) | | | | | |
|---|---|---|---|---|---|---|---|---|---|---|
|  |  |  |  |  | Initial N/15 mm | | 1 d N/15 mm | | 7 d N/15 mm | |
| none | 92LBT | GF19 | 2.69 | 3 | 0.82 | AS | 3.39 | AS | 3.49 | AS |
| none | mPET | GF19 | 2.67 | 3 | 1.27 | AS | 2.77 | AS | 2.15 | AT |
| none | PET-Al | GF19 | 2.67 | 3 | 0.67 | AS | 2.00 | AS | 2.25 | AS |
| none | PET-Al | 92LBT | 2.73 | 3 | 1.63 | AS | 2.04 | AT | 2.32 | AT |
| none | OPP | mOPP | 2.67 | 3 | 1.27 | AS | 1.66 | AT | 2.03 | AT |
| BYK 392(Acrylic) | 92LBT | GF19 | 2.69 | 3+ | 1.17 | AS | 3.74 | AS | 3.49 | AS |
| BYK 392(Acrylic) | mPET | GF19 | 2.73 | 3+ | 1.15 | AS | 2.62 | AS | 2.17 | AT |
| BYK 392(Acrylic) | PET-Al | GF19 | 2.73 | 3+ | 1.56 | AS | 4.76 | AS | 4.91 | AS |
| BYK 392(Acrylic) | PET-Al | 92LBT |  | 3+ | 1.15 | AS | 2.30 | AT | 2.48 | AT |
| BYK 392(Acrylic) | OPP | mOPP |  | 3+ | 1.25 | AS | 1.81 | AT | 1.85 | AT |
| BYK 356 Acrylic | 92LBT | GF19 | 2.86 | 3 | 1.01 | AS | 2.95 | AS | 2.30 | AT |
| BYK 233 (siloxane) | 92LBT | GF19 |  | 3 | 0.55 | AS | 3.35 | AS | 2.76 | AT |
| MODAFLOW 2100 | 92LBT | GF19 | 2.93 | 3+ | 1.28 | AS | 3.03 | AS | 2.64 | AT |
| MODAFLOW 2100 | mPET | GF19 | 2.77 | 3+ | 1.32 | AS | 2.81 | AS | 1.82 | AT |
| MODAFLOW 2100 | PET-Al | GF19 | 2.60 | 3+ | 1.35 | AS | 3.23 | AS | 2.38 | AT |
| MODAFLOW 2100 | PET-Al | 92LBT | 2.60 | 3+ | 1.56 | AS | 2.29 | AT | 2.21 | AT |
| MODAFLOW 2100 | OPP | mOPP | 2.60 | 3+ | 0.98 | AS | 1.72 | AT | 2.06 | AT |

All were run on at 50% solids on a 165QCH cylinder (65 lines/cm) which has quadrangular cells with interconnecting channels volume of 8.7 BCM (billion cubic microns)
Viscosity of the adhesive was 20 seconds (Zahn #2 Cup)
AS = Adhesive split (adhesive on both films)
AT = Adhesive transfer from primary to secondary film

TABLE 4

High speed laminations with additives at 55% solids.

Adhesive Mix: Polyester (Ex. 1)/Coreactant (Ex. 2)/additive (100/20/0.5)
All samples diluted to 55% solids with ethyl acetate. 165 QCH gravure cylinder

| Co-reactant | #2 Zahn Sec | Additive (parts/100 Part A) | 1° web | 2° web | Coat wt. g/sq m | Appearance Rating | Initial N/15 mm | | 1 d N/15 mm | | 7 d N/15 mm | |
|---|---|---|---|---|---|---|---|---|---|---|---|---|
| DESMODUR L 75 | | | | | | | | | | | | |
| | 19 | None | 92LBT | GF19 | 2.8 | 2+ | 1.19 | AS | 2.45 | AS | 3.03 | AT |
| | | None | mPET | GF19 | 2.8 | 2+ | 1.02 | AS/z | 2.48 | AS | 1.74 | AT |
| | | None | nylon | GF19 | 2.8 | 2+ | 0.99 | AS | 2.36 | AS | 1.55 | AT |
| | | None | PET-Al | GF19 | 2.9 | 3 | 1.32 | AS | 2.70 | AS | 2.33 | DES |
| | | None | PET-Al | 92LBT | 3.1 | 3 | 1.78 | AS | 3.98 | DES | 3.92 | DES |
| DESMODUR L 75 | | | | | | | | | | | | |
| | 21.7 | MF | PET-Al | 92LBT | 3.3 | 3+ | 1.45 | AS | 4.44 | DES | 3.69 | DES |
| | | MF | PET-Al | GF19 | 3.1 | 3+ | 1.54 | AS | 4.13 | AS | 3.59 | AT |
| | | MF | Nylon | GF19 | 3.1 | 3 | 1.16 | AS | 2.89 | AS | 2.12 | AT |
| | | MF | mPET | GF19 | 3.0 | 3 | 1.09 | AS | 2.37 | AS | 1.86 | AT |
| | | MF | PET | GF19 | 3.1 | 3 | 0.89 | AS | 2.67 | AS | 2.63 | AT |
| DESMODUR | | | | | | | | | | | | |
| | 22 | MF 2100 | 92LBT | GF19 | 3.2 | 3+ | 1.04 | AS | 1.95 | AS | 1.55 | AT |
| | | MF 2100 | mPET | GF19 | 3.1 | 3+ | 1.18 | AS | 2.11 | AS | 1.92 | AT |
| | | MF 2100 | nylon | GF19 | 3.2 | 3+ | 0.93 | AS | 2.45 | AS | 3.01 | AT |
| | | MF 2100 | PET-Al | GF19 | 3.1 | 3+ | 1.38 | AS | 2.80 | AS | 2.57 | AT |
| | | MF 2100 | PET-Al | 92LBT | 3.1 | 3+ | 1.55 | AS | 2.38 | DES | 3.39 | DES |
| DESMODUR L 75 | | | | | | | | | | | | |
| | 21.5 | BYK-392 | PET-Al | 92LBT | 3.1 | 3+ | 1.49 | AS | 3.75 | DES | 3.69 | DES |
| | | BYK-392 | PET-Al | GF19 | 3.1 | 3+ | 1.39 | AS | 3.03 | AS | 2.57 | AT |
| | | BYK-392 | Nylon | GF19 | 3.1 | 3+ | 0.89 | AS/z | 0.90 | AS | 1.23 | AT |
| | | BYK-392 | mPET | GF19 | 3.1 | 3+ | 1.15 | AS/z | 1.84 | AS | 1.62 | AT |
| | | BYK-392 | PET | GF19 | 3.3 | 3+ | 1.13 | AS | 2.34 | AS | 2.53 | AT |
| Example 2 | | | | | | | | | | | | |
| | 21.7 | MF 2100 | 92LBT | GF19 | 3.3 | 3+ | 0.94 | AS | 3.76 | AS | 3.45 | AT |
| | | MF 2100 | mPET | GF19 | 3.1 | 3+ | 1.50 | AS | 2.80 | DES | 2.72 | DES |
| | | MF 2100 | PET-Al | GF19 | 3.1 | 3+ | 1.93 | AS | 3.71 | AS | 2.73 | AT |
| | | MF 2100 | PET-Al | 92LBT | 3.1 | 3+ | 1.60 | AS | 2.69 | AS | 4.19 | AT | note:
z = zippy
MF = Modaflow

TABLE 5

Test additional hydroxyl functional acrylic additives in high speed laminating process.

Adhesive Mix: Polyester (Example 1)/Coreactant (Example 2)/Additive (100/18/0.5)
All samples were all diluted to 50% solids with ethyl acetate and run on 150 Quad cylinder Viscosity was 19 seconds for #2 Zahn cup

| Additive (0.5 parts/ 100 g Polyester | 1° web | 2° web | Coat wt. g/sq · m | Appearance Rating | Initial T-Peel N/15 mm | | 1 day N/15 mm | | 7 d N/15 mm | |
|---|---|---|---|---|---|---|---|---|---|---|
| | 92LBT | GF19 | 4.39 | 2 | 0.72 | AS | 2.12 | AS | 2.12 | AS |
| | mPET | GF19 | 4.65 | 2 | 0.87 | AS | 1.89 | AS | 3.56 | DES |
| | PET-Al | GF19 | 4.82 | 2 | 0.95 | AS | 2.88 | AS | 2.48 | AS |
| | PET-AL | 92LBT | 4.72 | 2 | 1.71 | AS | 3.39 | AS | 4.67 | DES |
| | 75 SLP | mOPP | 4.88 | 2 | 1.46 | AS | 1.29 | DES | 2.08 | DES |
| Ex. 6 | 92LBT | GF19 | 5.05 | 4 | 1.02 | AS | 2.13 | AS | 1.54 | AS |
| Ex. 6 | mPET | GF19 | 4.72 | 4 | 1.11 | AS | 2.07 | AS | 1.87 | AS |
| Ex. 6 | PET-Al | GF19 | 5.05 | 4 | 1.44 | AS | 2.28 | AS | 1.93 | AS |
| Ex. 6 | PET-AL | 92LBT | 4.72 | 4 | 2.19 | AS | 4.10 | AS | 4.28 | DES |
| Ex. 6 | 75 SLP | mOPP | | 4 | 1.40 | AS | 2.02 | DES | 2.34 | DES |
| Ex. 7 | 92LBT | GF19 | 4.88 | 3 | 0.91 | AS | 1.45 | AS | 2.12 | AS |
| Ex. 7 | mPET | GF19 | 4.72 | 3 | 1.04 | AS | 1.24 | AS | 3.31 | DES |
| Ex. 7 | PET-Al | GF19 | 4.72 | 3 | 1.59 | AS | 1.73 | AS | 2.39 | AS |

TABLE 5-continued

Test additional hydroxyl functional acrylic additives in high speed laminating process.

Adhesive Mix: Polyester (Example 1)/Coreactant (Example 2)/Additive (100/18/0.5)
All samples were all diluted to 50% solids with ethyl acetate and run on 150 Quad cylinder Viscosity was 19 seconds for #2 Zahn cup

| Additive (0.5 parts/ 100 g Polyester) | 1° web | 2° web | Coat wt. g/sq · m | Appearance Rating | Initial T-Peel N/15 mm | | 1 day N/15 mm | | 7 d N/15 mm | |
|---|---|---|---|---|---|---|---|---|---|---|
| Ex. 7 | PET-AL | 92LBT | 4.88 | 3 | 1.02 | AS | 4.51 | DES | 5.37 | DES |
| Ex. 7 | 75 SLP | mOPP |  | 3 | 1.03 | AS | 2.02 | AS | 2.98 | DES |

*Gravure cylinder 150 lines/in (59 lines/cm) quadrangular cells, 14.8 BCM
BCM = billion cubic microns
AS = Adhesive split (on both films
DES = Film breaks or tears

TABLE 6

Hydroxy functional acrylics

Adhesive Mix: Polyester(Ex. 1)/Coreactant (Ex. 2)/Additive (100/20.5/0.1-0.2)
All run at 50% solids on 150 lines/in (59 lines/cm) quadrangular cell cylinder

| #2 Zahn Sec | Ex. 8 Additive (g/100 g Polyester) | 1° web | 2° web | Coat wt. g/sq m | Appearance Rating | Initial T-Peel N/15 mm | | 1 d N/15 mm | | 7 d N/15 mm | |
|---|---|---|---|---|---|---|---|---|---|---|---|
| 17.2 | 0.1 | 75 SLP | 70 SPW | 3.91 | 2+ | 1.82 | AS | 3.91 | DES | 2.54 | DES |
| 18.5 | 0.2 | 75 SLP | 70 SPW | 3.91 | 2+ | 1.92 | AS | 4.70 | DES | 2.47 | DES |
|  | 0.125 | nylon | GF10 | 2.77 | 3 | 1.05 | AS | 9.74 | DES | 11.20 | DES |
|  | 0.125 | 92LBT | GF10 | 2.60 | 3 | 1.10 | AS | 2.14 | AS | 7.90 | DES |
|  | 0.125 | 92LBT | GF19 |  |  | 0.69 | AS | 2.52 | AS | 3.04 | AS |
|  | 0.125 | 92LBT | GF19 | 2.44 | 3 | 1.58 | AS | 3.63 | AS | 2.21 | AS |
|  | 0.125 | nylon | GF10 |  |  | 1.58 | AS | 7.56 | DES | 2.15 | DES |
|  | 0.25 | nylon | GF10 |  | 2+ | 2.28 | AS | 9.11 | DES | 3.76 | DES |
| 20 | 0.08 | nylon | GF10 | 2.60 | 3+ | 1.79 | AS | 6.14 | DES | 4.96 | DES |
|  | 0.125 | PET-AL | CPP | 4.56 | 3 | 1.78 | AS | 7.12 | AT | 7.42 | AT |
|  | 0.125 | PET-Al | PET | 4.39 | 3 | 0.52 | AS | 4.16 | DES | 5.27 | DES |
|  | 0.125 | PET-Al | GF10 | 4.39 | 3 | 1.35 | AS | 9.25 | DES | 9.76 | DES |
|  | 0.125 | PET-Al | GF19 | 4.39 | 3 | 1.18 | AS | 5.86 | DES | 8.96 | DES |
|  | 0.125 | mPET | GF19 | 4.39 | 3 | 0.74 | AS | 2.37 | DES | 1.55 | DES |
|  | 0.125 | 92LBT | GF10 | 4.56 | 3 | 1.44 | AS | 6.15 | DES | 9.77 | DES |
|  | 0.125 | 92LBT | GF19 | 4.56 | 3 | 1.03 | AS | 4.35 | AT | 7.65 | DES |
|  | 0.125 | 75SLP | mOPP | 4.56 | 3 | 0.84 | AS | 2.14 | DES | 2.84 | DES |
|  | 0.125 | 75SLP | 70SPW | 4.56 | 3 | 1.14 | AS | 1.90 | DES | 2.84 | DES |

TABLE 7

Adhesive Mix: Polyester (Ex. 1)/Coreactant (Ex. 2)/additive (100/20.5/0.4-1.4)

All samples diluted to 50% solids with ethyl acetate.
A 165 line/in (65 lines/cm) cylinder with channeled quadrangular cells was used.

| Drier Zones | 1 | 2 | 3 | Corona Treater Output | |
|---|---|---|---|---|---|
| Temp (F.) | 180 | 170 | 200 | Primary | 2.0 Kw |
| Viscosity 16.5 seconds #2 Zahn cup | | | | Secondary | 3.0 Kw |

| Ex. 6 Additive (g/100 g Polyester) | 1° web | 2° web | Coat wt g/sq m | Appearance Rating | Green Bonds N/15 mm | | 24 h N/15 mm | | 7 d N/15 mm | |
|---|---|---|---|---|---|---|---|---|---|---|
| 0.4 | 92LBT | GF19 | 2.93 | 3+ | 1.06 | AS | 3.53 | AS | 3.91 | AS |
| 0.4 | 92LBT | GF10 | 2.93 | 3+ | 2.00 | AS | 5.67 | DES | 9.06 | DES |
| 0.4 | mPET | GF10 | 2.93 | 3+ | 1.09 | AS | 2.07 | DES | 2.44 | DES |
| 0.4 | mPET | GF19 | 2.77 | 3+ | 1.46 | AS | 2.44 | DES | 3.21 | DES |
| 0.4 | 75SLP | GF10 | 2.77 | 3+ | 1.76 | AS | 3.66 | DES | 3.59 | DES |

TABLE 7-continued

Adhesive Mix: Polyester (Ex. 1)/Coreactant (Ex. 2)/additive (100/20.5/0.4-1.4)

All samples diluted to 50% solids with ethyl acetate.
A 165 line/in (65 lines/cm) cylinder with channeled quadrangular cells was used.

| | | | | | | | | | | |
|---|---|---|---|---|---|---|---|---|---|---|
| 0.4   | PET-Al | GF10  | 2.77 | 3+ | 2.09  | AS | 7.63 | DES | 9.16  | DES |
| 0.4   | PET-Al | GF19  | 2.93 | 3+ | 1.79  | AS | 5.26 | AT  | 4.76  | AT  |
| 0.4   | PET-Al | 92LBT | 3.01 | 3+ | 1.37  | AS | 3.96 | DES | 5.25  | DES |
| 0.4   | 75SLP  | mOPP  | 3.09 | 3  | 1.12  | AS | 1.76 | AT  | 1.69  | AT  |
| 0.4   | 92LBT  | 70SPW | 2.93 | 3+ | 1.78  | AS | 2.04 | DES | 4.37  | DES |
| 0.75  | 75SLP  | GF10  | 2.52 | 4  | 1.24  | AS | 3.83 | DES | 3.07  | DES |
| 0.75  | 92LBT  | GF10  | 2.93 | 4  | 1.47  | AS | 6.04 | DES | 7.91  | DES |
| 0.75  | 92LBT  | GF19  | 2.93 | 4  | 0.94  | AS | 3.20 | AS  | 3.79  | AS  |
| 0.75  | mPET   | GF19  | 2.93 | 4  | 0.94  | AS | 2.41 | DES | 2.65  | DES |
| 0.75  | mPET   | GF10  | 0.00 | 4  | 0.96  | AS | 2.15 | DES | 2.32  | DES |
| 0.75  | PET-Al | GF10  | 2.93 | 4  | 1.72  | AS | 8.28 | DES | 9.78  | DES |
| 0.75  | PET-Al | GF19  | 3.01 | 4  | 1.56  | AS | 8.24 | DES | 8.60  | DES |
| 0.75  | PET-Al | 92LBT | 3.09 | 4  | 0.82  | AS | 4.53 | DES | 4.31  | DES |
| 0.75  | 75SLP  | mOPP  | 2.93 | 4  | 1.00  | AS | 1.58 | AT  | 1.69  | AT  |
| 0.75  | 92LBT  | 70SPW | 2.93 | 4  | 1.51  | AS | 2.22 | DES | 3.79  | DES |
| 0.75  | 92LBT  | CPP   | 2.93 | 4  | 1.57  | AS | 6.96 | DES | 7.39  | DES |
| 0.525 | 75SLP  | GF19  | 2.77 | 4  | 0.83  | AS | 4.09 | DES | 4.30  | DES |
| 0.525 | 75SLP  | GF10  | 2.77 | 4  | 1.24  | AS | 4.26 | DES | 3.70  | DES |
| 0.525 | 75SLP  | mOPP  | 2.85 | 4  | 0.59  | AS | 1.66 | AT  | 2.61  | DES |
| 0.525 | PET-Al | 92LBT | 2.93 | 4  | 0.51  | AS | 3.73 | DES | 4.35  | DES |
| 1.4   | 92LBT  | GF19  | 2.93 | 4  | 0.498 | AS | 2.39 | AS  | 10.3  | DES |

Example 10

NCO Terminated Prepolymer made from Example 6 Acrylic Polyol

| Item | Monomer/Intermediate | Charge (grams) |
|---|---|---|
| 1 | ISONATE 125M, MDI | 100 |
| 2 | Acrylic polyol (Example 6) | 7.68 |
| 3 | Polypropylene glycol (425 Mole wt) | 47.3 |
| 4 | Ethyl Acetate | 27.4 |
| 5 | Benzoyl chloride | 0.1 |

1. Item 1 was heated to 50° C. in an oven and charged to a 500 mL three neck flask equipped with stirrer, reflux condenser, and nitrogen inlet. The reaction mixture was stirred and a slow stream of dry nitrogen was passed through the reactor throughout the reaction time.
2. The reactor was heated to 60°-65° C. and item 2 added.
3. The temperature was increased and held at 70°-75° C. for 30 min
4. Item 3 was added and the temperature maintained at 80-95° C. about 90 min.
5. The temperature was reduced to 65° C. Items 4 and 5 were added.
6. The product was cooled further then packaged.

The product had the following properties: Before adding ethyl acetate, 15.0% NCO. After adding ethyl acetate: Solvent, 15.4% (84.6% solids), Viscosity 400 mPas (Brookfield viscometer, #3 spindle at 20 rpm). Initially, the product was a clear, light yellow solution.

After a few days it became hazy, but there was no phase separation.

Laminates made as described in Example 4 showed good flow and wetting and had the following properties.

Polyester (100) Example 1
Co-reactant (18) Example 10
Mixed Viscosity 22.8 mPa·s

| | N/15 mm | |
|---|---|---|
| 92LBT/GF19 | | |
| Initial | 1.46 | AS |
| 24 hr | 5.70 | Destruct |
| 7 day | 6.16 | Destruct |
| PET-Al/GF19 | | |
| Initial | 1.18 | AS |
| 24 hr | 6.47 | Destruct |
| 7 day | 6.67 | Destruct |

AS = Adhesive Split (Adhesive on both films); Destruct = Film breaks or tears

The invention claimed is:

1. A method for improving flow of a two-component urethane system by adding a hydroxy-functional acrylic polymer having $M_n$ from 5,000 to 70,000 and from 10 to 50 mole % polymerized residues of a $C_2$-$C_8$ hydroxyalkyl (meth)acrylate; in which the urethane system comprises: (a) a hydroxy-terminated polyester polyol; and (b) an isocyanate-terminated prepolymer comprising polymerized residues of: (i) at least one of diphenyl methane diisocyanate and toluene diisocyanate, and (ii) a glycol or polyol; and wherein the urethane system contains from 0.1 to 3 wt % of the hydroxy-functional acrylic polymer.

2. The method of claim 1 in which polymerized residues of a $C_2$-$C_4$ hydroxyalkyl (meth)acrylate comprise from 12 to 30 mole % of the hydroxy-functional acrylic polymer.

3. The method of claim 2 in which said glycol or polyol has $M_n$ from 90 to 1000, and the hydroxy-terminated polyester polyol comprises polymerized residues of: (i) phthalic acid and (ii) an aliphatic diol having $M_n$ from 60 to 150; wherein the hydroxy-terminated polyester polyol has a hydroxyl number from 15 to 60 mg KOH/g.

4. The method of claim 3 in which the hydroxy-terminated polyester polyol comprises polymerized residues of: (i) 40 to 75 wt % of phthalic acid, and (ii) 25 to 60 wt % of an aliphatic diol having $M_n$ from 60 to 150.

5. The method of claim 4 in which the isocyanate-terminated prepolymer comprises polymerized residues of: (i) 50 to 85 wt % of at least one of diphenyl methane diisocyanate and toluene diisocyanate; and (ii) 15 to 50 wt % of a glycol or polyol having $M_n$ from 90 to 1000.

6. The method of claim 5 in which the hydroxy-terminated polyester polyol comprises polymerized residues of: (i) 59 to 75 wt % of phthalic acid, and (ii) 39 to 60 wt % of an aliphatic diol having $M_n$ from 60 to 150.

7. The method of claim 6 in which said glycol or polyol has $M_n$ from 150 to 800.

8. The method of claim 7 in which the hydroxy-functional acrylic polymer has Mn from 7,000 to 30,000.

9. The method of claim 5 in which the urethane system contains from 0.1 to 2 wt % of the hydroxy-functional acrylic polymer.

10. The method of claim 9 in which the hydroxy-terminated polyester polyol comprises polymerized residues of: (i) 59 to 75 wt % of phthalic acid, and (ii) 39 to 60 wt % of an aliphatic diol having $M_n$ from 60 to 150.

11. The method of claim 10 in which the hydroxy-functional acrylic polymer has Mn from 7,000 to 30,000.

* * * * *